United States Patent Office 3,163,623

Patented Dec. 29, 1964

3,163,623

SINGLE STEP PROCESS FOR PRODUCING ALKYLOLATED ACRYLAMIDE-CONTAINING INTERPOLYMERS

Kazys Sekmakas, Chicago, Robert E. Ansel, Berkeley, and Karolis Drunga, Chicago, Ill., assignors to DeSoto Chemical Coatings, Inc., Chicago, Ill., a corporation of Delaware No Drawing. Filed Apr. 5, 1961, Ser. No. 100,804
14 Claims. (Cl. 260—72)

The present invention relates to the production of alkylolated acrylamide-containing interpolymers in a single processing step, preferably employing continuous monomer addition. The invention includes as an important optional feature, the simultaneous and controlled etherification of the alkylolated interpolymer.

Alkylolated acrylamide-containing interpolymers and etherified derivatives thereof are known products. However, production of these products in the past has required the use of a plurality of successive reactions, substantially adding to the cost of production. Thus, previous efforts have involved a preliminary polymerization and, then, in subsequent steps, the acrylamide-containing interpolymer is alkylolated and etherified.

Referring specifically to the prior art as presented in United States Patent Nos. 2,870,117, 2,940,943, 2,940,944 and 2,940,945, the known procedure requires the following steps:

(1) The charging of all monomers, butanol, and catalyst into the reactor.

(2) Polymerization with free radical catalysts.

(3) Addition of alcoholic formaldehyde and acid catalyst.

(4) Condensation of acrylamide and formaldehyde by refluxing.

(5) Distillation of half of the solvent, in order to replace butanol with xylol or any other aromatic hydrocarbon solvent. (This step is detrimental for it eliminates control of the amount of waterremoval and, as a result, control of the extent of etherification.)

(6) Recovery of the used solvent.

This procedure is not well adapted to large scale production due to extreme exothermic reaction of the monomers and difficult control of processing conditions, which result in poor batch to batch reproduction of results. Control of the degree of etherification is also very difficult in the known procedure.

In accordance with the present invention, organic solvent, aldehyde and the desired monomers including an acrylamide are reacted with one another in the presence of heat and in the presence of a basic catalyst and a free-radical generating polymerization catalyst, and polymerization and alkylolation take place simultaneously. Preferably, the monomers are added to the organic solvent solution which is added slowly and at a uniform rate (desirably by continuous addition) to permit more precise control of the reaction and to provide a more uniform interpolymer product. Also continuous monomer addition enables temperature control during the reaction despite the highly exothermic reaction which normally occurs. In the presence of alcohol, continuous removal of water, as by refluxing coupled with azeotropic distillation, etherification takes place at the same time and at least some of the methylol groups in the alkylolated product are etherified.

The alkaline catalyst is essential to the invention, for its absence leads to the production of an insoluble gelled structure which is not useful.

At least 0.1% of alkaline catalyst, based on the weight of monomers being copolymerized, is essential to avoid gelation. On the other hand, it is preferred to use not more than 1.0% of alkaline catalyst because the products so-produced have slow curing properties and are less desirable.

Any alkaline compound may be used, those having a nitrogen base being preferred. Amines, and especially tertiary amines are particularly preferred. Thus, inorganic alkaline compounds such as alkali metal hydroxides and alkaline earth metal hydroxides are broadly operable, but are not preferred because these introduce impurities into the resinous product. Ammonia is quite suitable as are quaternary ammonium compounds such as tetramethyl ammonium hydroxides. Amines such as ethyl amine and butyl amine may be used. However, tertiary amines illustrated by triethyl amine, tripropyl amine and tributyl amine are particularly preferred. The degree of etherification may be changed, and thereby controlled, by changing the amount of alkaline catalyst which is employed.

The present invention includes the presence of acids in the basic reaction medium for this causes the production of catalytic salts which increases the efficiency of cure. Maleic acid is particularly preferred as the acid for use in forming catalytic salts in situ.

The etherified alkylolated acrylamide-containing interpolymers which may be produced are generally, though not specifically, described, for example, in United States Patent Nos. 2,173,005, 2,870,116, 2,870,117, 2,940,943, 2,940,944 and 2,940,945. Thus, the invention is generally directed to resinous materials obtained by reacting a monoaldehyde, particularly formaldehyde, with an interpolymer of ethylenically unsaturated amide, such as acrylamide, and one or more polymerizable ethylenically unsaturated monomers. These aldehyde modified amide interpolymers may be used as such or etherified by reaction with lower alkyl alcohol. In brief summary, the invention is concerned with interpolymers of an acrylamide with at least one other ethylenically unsaturated monomer (preferably a monomer containing the $$CH_2{=}C<$$

group), said interpolymer having amido hydrogen atoms replaced by the structure $$-ROR_1$$

wherein R is a saturated lower aliphatic hydrocarbon radical having its free valences on a single carbon atom, and $R_1$ is a member of the class consisting of hydrogen and lower alkyl radicals, especially those containing from 3–8 carbon atoms in the radical.

Considerable variation is permissible in the kind and ratio of the monomers used to form the interpolymer, the aldehyde modifying agent, and the etherifying agent, as is well known.

While it is preferred to employ acrylamide in proportions of from 5 to 45%, preferably from 5 to 20% by weight, with unsaturated monomers containing the $CH_2=C<$ group, the invention is not limited to acrylamide or to the presence of a terminal methylene group. Thus, other acrylamide monomers such as methacrylamide and itaconate diamide may be used. While the preferred unsaturated monomers interpolymerized with acrylamide do contain the $CH_2=C<$ group and it is preferred to use combinations of the monomers which form hard polymers such as styrene, vinyl toluene and methyl methacrylate with monomers which form soft polymers such as monoethylenically unsaturated carboxylic acid esters having a terminal aliphatic hydrocarbon group containing from 2–20 carbon atoms, illustrated by ethyl acrylate, butyl acrylate, 2-ethylhexyl acrylate, and stearyl acrylate, the invention is not restricted to the selection of monomers containing the $CH_2=C<$ group or to the selection of preferred combinations of monomers. Thus, monomers which do not contain the $CH_2=C<$ group may be interpolymerized with acrylamide either alone or in the presence of monomers which do contain the $CH_2=C<$ group. Particular attention is directed to maleic acid or anhydride, maleic acid monoesters and diesters, butene-2 and fatty acids containing conjugated unsaturation such as dehydrated castor oil fatty acids which are useful in the production of interpolymers with acrylamide. Such interpolymers are illustrated by: a solution copolymer of 20 parts of acrylamide, 40 parts of maleic anhydride and 40 parts of butene-2; and by a solution copolymer of 20 parts of acrylamide, 20 parts of maleic anhydride, 20 parts of dibutyl maleate and 40 parts of butene-2.

The interpolymers of the invention result from a solution copolymerization in the presence of free-radical polymerization catalyst. Mercaptan chain terminating agents may, optionally, be present.

Any free-radical generating polymerization catalyst may be used, the selection of catalyst being determined by the desired temperature of the polymerization reaction. The important point is that the agent liberate free radicals under the conditions of polymerization so that the addition polymerization is facilitated.

Thus, copolymerization catalysts which generate free radicals starting at low temperatures, e.g., from 30–50° C. are usable, these being illustrated by acetyl benzoyl peroxide, peracetic acid, hydroxybutyl peroxide, isopropyl percarbonate, cyclohexanone peroxide, cyclohexyl peroxide, 2,4-dichlorobenzoyl peroxide, and cumene hydroperoxide.

Suitable catalysts which are active to begin generating free radicals at somewhat more elevated temperatures of about 60° C. are illustrated by t-butyl hydroperoxide, methyl amyl ketone peroxide, acetyl hydroperoxide, lauroyl peroxide, methyl cyclohexyl hydroperoxide, t-butyl permaleic acid, t-butyl perbenzoate, di-t-butyl diperphthalate, N,N'-azodiisobutyronitrile and benzoyl peroxide.

Preferably, free-radical generating catalysts which become active at still more elevated temperatures of about 100° C. are used in accordance with the invention, these being illustrated by t-butyl perphthalic acid, p-chlorobenzoyl peroxide, t-butyl peracetate, dibenzal diperoxide and di-t-butyl peroxide.

The aldehyde modifying agent is desirably used in an amount of from 0.2–5 equivalents of aldehyde, and preferably in an amount of from 1–4 equivalents of aldehyde for each amide group used in the formation of the acrylamide interpolymer. The preferred aldehyde is formaldehyde. Other monoaldehydes, including acetaldehyde, propionaldehyde, butyraldehyde, and furfural, or substances yielding an aldehyde, such as paraformaldehyde, hexamethylenetetramine or trioxymethylene can also be used.

Etherification of the aldehyde-modified amide interpolymer is preferred, but not essential. Lower alcohols containing up to 8 carbon atoms, especially butanol, are preferred for etherification and the etherification reaction may be carried out up to 100% of the alkylol radical present in the interpolymer although partial etherification is preferred. The degree of etherification is easily controlled in accordance with the invention by adjusting the proportion of alkaline catalyst, such control being a feature of the invention. When less than 100% etherification is effected, the product is a mixture in which the amide hydrogen atoms in some of the acrylamide interpolymer molecules are replaced by the structure —ROH, and the amide hydrogen atoms in other of the acrylamide interpolymer molecules are replaced by the structure —$ROR_1$, R representing a saturated aliphatic hydrocarbon radical introduced by the aldehyde modifying agent and $R_1$ is the residue of the etherifying alcohol.

The alkylolated acrylamide-containing interpolymers of the invention are broadly similar to prior materials in that they may be combined with alkyd resins, epoxy resins and aminoplast resins, etc. However, the products of the invention are specifically and importantly different from prior materials because they exhibit improved compatibility with other resinous materials in organic solvent solution. This improved compatibility is particularly evident in combination with aminoplast resins such as solvent-soluble, heat-hardening condensation products of formaldehyde with polyamines such as urea and melamine. Thus, compatibilty in solution is restricted for melamine resins to about 15% based on the total weight of resin while the invention permits compatibility at higher concentrations, e.g., up to about 70% by weight.

The invention is illustrated in the examples which follow:

EXAMPLE 1

*Charge Composition*

| | Grams |
|---|---|
| Acrylamide | 150 |
| Styrene | 400 |
| Methyl acrylate | 50 |
| Ethyl acrylate | 350 |
| Vinyl stearate | 50 |
| Xylol | 333 |
| n-Butanol | 333 |
| Butyl Cellosolve | 320 |
| 40% formaldehyde solution in butanol | 275 |
| di-Tert. butyl peroxide | 5 |
| Triethyl amine | 3.2 |
| Azobisbutyronitrile | 5 |
| Tert-dodecyl mercaptan | 14 |

*Procedure for Polymerization*

Charge 333 grams of xylol, 333 grams of butanol and 75 grams of 40% formaldehyde solution in butanol into a reactor equipped with an agitator, condenser, Dean-Stark trap, thermometer and nitrogen inlet.

The initial charge is heated to reflux temperature (235–240° F.). Then dissolve 150 grams of acrylamide in 320 grams of butyl Cellosolve and 200 grams of 40% formaldehyde solution in butanol and premix with 400 grams of styrene, 50 grams of methyl acrylate, 150 grams of ethyl acrylate and 50 grams of vinyl stearate.

To this monomer blend add 5 grams of di-tert-butyl peroxide, 5 grams of azobisbutyronitrile, 14 grams of tertiary dodecyl mercaptan and 3.2 grams of triethyl amine to provide the desired catalysts. Dodecyl mercaptan is a chain-terminating agent.

The above blend is added to the reactor over a 2½ hour period of time and the mixture is maintained at 245–255° F. while concomitantly removing water by azeotropic distillation.

The reaction mixture is maintained at reflux temperature (255° F.) for 7 hours and 46 grams of water are collected in the Dean-Stark trap. Total processing time is 9½ hours.

The resulting interpolymer had the following physical characteristics:

| | |
|---|---|
| Solids (percent) | 47.5 |
| Viscosity (Gardner-Holdt) | W–X |

*Evaluation of the Interpolymer of Example 1*

A white enamel having a composition of 29% titanium dioxide rutile and 33% non-volatile resin, was applied on Bonderite Steel panel using 3 mil. wet film draw downs and baked for 20 minutes at 325° F. in a gas fired oven. The following results were obtained:

| | Additive | Pencil Hardness | Flexibility (Conical Mandrel) | Toluol Resistance |
|---|---|---|---|---|
| 1 | None | H | Passes ⅛" | Fair-good. |
| 2 | 0.5% $H_3PO_4$ Acid | 2H | do | Excellent. |
| 3 | 0.5% $H_3PO_4$ Acid Resinous polyol (1). | 2H | do | Do. |

Note (1): A copolymer of styrene and allyl alcohol having an average molecular weight of 1150 and an average equivalent weight, based on hydroxyl functionality, of 222.

EXAMPLE 2

Example 1 is repeated with the single exception being the fact that 3.2 grams of triethyl amine is not included in the monomer blend.

After 2½ hours, when 1500 grams of the monomer blend had been added to the reactor, the polymer was gelled and is not soluble in common organic solvents.

EXAMPLE 3

This interpolymer is prepared in the presence of ammonium hydroxide catalyst. The same procedure used in Example 1 is used in the present example.

*Composition Charge*

| | Grams |
|---|---|
| Acrylamide | 150 |
| Styrene | 400 |
| Ethyl acrylate | 300 |
| Vinyl stearate | 100 |
| Methyl acrylate | 50 |
| 40% solution of formaldehyde in butanol | 275 |
| Xylol | 233 |
| n-Butanol | 433 |
| Butyl Cellosolve | 320 |
| Ammonium hydroxide (28%) | 8 |
| di-Tert-butyl peroxide | 5 |
| Azobisbutylronitrile | 5 |
| Tert-dodecyl mercaptan | 14 |

The interpolymer had the following physical characteristics:

| | |
|---|---|
| Solids (percent) | 48.0 |
| Viscosity (Gardner) | U |

EXAMPLE 4

*Charge Composition*

| | Grams |
|---|---|
| Acrylamide | 150 |
| Styrene | 400 |
| Methyl acrylate | 50 |
| Ethyl acrylate | 350 |
| Vinyl stearate | 50 |
| Xylol | 333 |
| n-Butanol | 333 |
| Butyl Cellosolve | 320 |
| 40% solution of formaldehyde in butanol | 275 |
| Triethyl amine | 3.2 |
| di-Tert-butyl peroxide | 5 |
| Azobisbutyronitrile | 5 |
| Tert-dodecyl mercaptan | 14 |

*Procedure for Polymerization*

Charge 333 grams of xylol, 333 grams of butanol and 75 grams of 40% formaldehyde solution in butanol into a reactor equipped with an agitator, condenser, Dean-Stark trap, thermometer and nitrogen inlet.

The initial charge is heated to reflux temperature (235–240° F.). Then dissolve 150 grams of acrylamide in 320 grams of butyl Cellosolve and 200 grams of 40% formaldehyde solution in butanol and premix with 400 grams of styrene, 50 grams of methyl acrylate, 350 grams of ethyl acrylate and 50 grams of vinyl stearate.

To this monomer blend add 5 grams of di-tert-butyl peroxide, 5 grams of azobisbutyronitrile, 14 grams of tertiary dodecyl mercaptan and 3.2 grams of triethyl amine to provide the desired catalysts.

The above blend is added to the reactor over a 2½ hour period of time and the mixture is maintained at 245–255° F. while concomitantly removing water by azeotropic distillation.

The reaction mixture is maintained at reflux temperature (255° F.) for 10 hours. 22 grams of water are collected in the Dean-Stark trap.

The resulting interpolymer has the following physical characteristics:

| | |
|---|---|
| Solids (percent) | 47.5 |
| Viscosity (Gardner) | W–X |

The resin of Example 4 is utilized in an enamel formulation containing 28% titanium dioxide and 32% non-volatile resin.

The characteristics of the enamel are checked without catalyst, with 0.5% phosphoric acid (based on resin solids), and 5% of resinous polyol (based on resin solids). The enamel was drawn down on Bonderite Steel panel and baked 20 minutes at 325° F.

| | No Additive | 0.5% Phosphoric Acid | 0.3% Phosphoric Acid, 5% Resinous Polyol (see Note 1, Ex. 1) |
|---|---|---|---|
| Gloss and appearance | Excellent | Excellent | Excellent. |
| Pencil Hardness | HB | 3H | 3H. |
| Flexibility (conical mandrel). | Fail ⅝" bend | Pass ⅛" bend | Pass ⅛" bend. |
| Impact (Forward) | Pass 25 in lbs | Pass 35–40 in lbs. | Pass 35–40 in lbs. |

The above white enamel is also evaluated as a coating applied to aluminum using #40 W. W. rod drawdown and a baking schedule of 1 minute at 500° F. The following results are obtained.

| Catalyst | Gloss and Appearance | Pencil Hardness | Adhesion | Toluol Resistance |
|---|---|---|---|---|
| None | Excellent | 2H | Very Good | Excellent. |
| 0.5% Phosphoric Acid | do | 4H | do | Do. |
| 0.5% Resinous Polyol (see Note 1, Ex. 1). | do | 3H | do | Do. |

EXAMPLE 5

66.7 parts of a 60% resin solids solution of benzoguanamine-formaldehyde resin in a 50/50 weight ratio mixture of butanol/xylol is mixed with 126 parts of the 47.5% resin solids solution produced in Example 4 and the mixture is pigmented to include 28% by weight of titanium dioxide rutile, based on total solids, and thinned to 32% non-volatile resin solids with xylol. The benzoguanamine-formaldehyde resin is a condensation product of 4 mols of formaldehyde with 1 mol of benzoguanamine in the presence of excess butanol and an acid catalyst to provide a heat-hardening resin etherified with butanol to provide solvent solubility. The benzoguanamine-formaldehyde resin solution has a viscosity on the Gardner-Holdt scale at 25° C. of G–K.

A 0.003" drawdown of the enamel is made on bare steel panels and baked 20 minutes at 350° F. The following results were obtained:

| | |
|---|---|
| Gloss and appearance | Excellent |
| Pencil hardness | 3H–4H |
| Mar resistance | Very good |
| Flexibility | Very good |
| Toluol resistance | Excellent |

EXAMPLE 6

A heat-hardening solvent-soluble melamine-formaldehyde condensate etherified with butanol to provide solvent solubility is employed in the form of a 55% by weight resin solids solution containing 25% of butanol and 20% of xylol. The melamine-formaldehyde resin is provided by heat reacting 5.5 mols of formaldehyde with 1 mol of melamine in the presence of excess butanol and a small amount of an acid catalyst. The resin solution has a Gardner-Holdt viscosity at 25° C. of L–O and tolerates 180 pounds of mineral spirits per 100 pounds of resin solution. This melamine resin solution is mixed with the resin solution produced in Example 4 to provide a 75/25 weight ratio mixture of acrylamide interpolymer solids and melamine resin solids. The resulting mixture was then milled with titanium dioxide rutile and thinned with xylol to provide a coating composition containing 28% by weight of titanium dioxide based on total solids and 32% by weight of non-volatile resin solids based on the total weight of the solution.

This coating composition is applied to bare steel to form a 0.003" wet film drawdown and baked for 20 minutes at 350° F. The resulting coated product shows good gloss and appearance, a pencil hardness of 3H, very good flexibility and excellent resistance to toluol.

Good results are also obtained by modifying the coating composition of the present example through replacement of the melamine-formaldehyde resin with a corresponding weight proportion of other resins such as:

(1) A castor oil-modified heat-hardening alkyd resin prepared from 33.8 parts of dehydrated castor oil, 39.0 parts of phthalic anhydride, 1.7 parts of benzoic acid and 25.5 parts of glycerine, the oil-modified alkyd product having a solids content of 50% by weight in xylol, a viscosity of $Z–Z_1$ on the Gardner-Holdt scale, and an acid value of 6;

(2) A copolymer of alkyd resin modified with dehydrated castor oil, the alkyd being prepared from 42.0 parts of dehydrated castor oil, 10.0 parts of glycerine, and 18.0 parts of phthalic anhydride. This oil-modified alkyd is then copolymerized with 27.0 parts of methyl methacrylate and 3.0 parts of styrene to provide a 60% resin solids solution of copolymer in xylene having a Gardner-Holdt viscosity of U–V and an acid value of 8.0; and (3) A substantially diglycidyl ether of 2,2'-bis-(p-hydroxyphenylpropane) having a molecular weight of about 1000, an epoxide equivalent weight of about 500 (grams per epoxide equivalent weight), and a melting point of from 65–75° C.

EXAMPLE 7

A further illustrative butylated methylolated acrylamide-containing interpolymer is produced using the process set forth in Example 4 from the following components:

*Charge Composition*

| | Grams |
|---|---|
| Acrylamide | 150 |
| Vinyl stearate | 100 |
| Styrene | 400 |
| Methyl acrylate | 50 |
| Ethyl acrylate | 350 |
| Butyl acrylate | 150 |
| Xylol | 333 |
| n-Butanol | 333 |
| 40% solution of formaldehyde in butanol | 275 |
| di-Tert-butyl peroxide | 5 |
| Triethyl amine | 4.2 |
| Azobisbutylronitrile | 5 |
| Tert-dodecyl mercaptan | 14 |

The resin product has the following final characteristics:

| | |
|---|---|
| Solids (percent) | 47.1 |
| Viscosity (Gardner-Holdt) | U–V |

EXAMPLE 8

An enamel is prepared using the 47.1% resin solids solution of Example 7 and the 60% resin solids solution of benzoguanamine-formaldehyde resin described in Example 5. These resin solutions are mixed together to provide a weight ratio mixture of 45 parts of the product of Example 7 to 55 parts of benzoguanamine-formaldehyde resin, diluted with xylol and pigmented to contain 28% by weight of titanium dioxide rutile. Dilution is sufficient to provide a non-volaiile resin solids content of 32%.

A 0.003" draw down of the enamel is made on bare steel panels and baked for 20 minutes at 350° F. The following results are obtained.

| | |
|---|---|
| Gloss and appearance | Excellent |
| Pencil hardness | 4H–5H |
| Mar resistance | Very good |
| Toluol resistance | Excellent |

EXAMPLE 9

An enamel is prepared using the 47.1% resin solids solution of Example 7 and a 60% resin solids solution of urea-formaldehyde resin in a solvent medium containing a 20/30 weight ratio of butanol and xylol. This resin solution has a Gardner-Holdt viscosity of L–Q, a capacity to tolerate at least 50 pounds of mineral spirits per 100 pounds of resin solution and an acid number of 3–8. These resin solutions are mixed together to provide a weight ratio mixture of 60 parts of the product of Example 7 to 40 parts of urea-formaldehyde resin. This mixture is then diluted with xylol to provide a non-volatile resin solids content of 32% and pigmented with with titanium dioxide rutile to provide 28% by weight of pigment base on total solids.

A 0.003" draw down of the enamel is made on bare steel panels and baked for 20 minutes at 350° F. The following results are obtained.

| | |
|---|---|
| Gloss and appearance | Good |
| Pencil hardness | 2H–3H |
| Mar resistance | Very good |
| Toluol resistance | Excellent |
| Flexibility | Excellent |

EXAMPLE 10

Still another illustrative butylated methylolated acrylamide containing interpolymer is produced using the process set forth in Example 4 from the following components:

*Charge Composition*

| | Grams |
|---|---|
| Acrylamide | 150 |
| Styrene | 400 |
| Vinyl stearate | 200 |
| Methyl acrylate | 50 |
| Ethyl acrylate | 200 |
| Xylol | 333 |
| n-Butanol | 333 |
| Butyl Cellosolve | 320 |
| 40% solution of formaldehyde in butanaol | 275 |
| di-Tert-butyl peroxide | 5 |
| Triethyl amine | 4.2 |
| Azobisbutyronitrile | 5 |
| Tert-dodecyl mercaptan | 16 |

The resin product has the following final characteristics:

| | |
|---|---|
| Solids (percent) | 46 |
| Viscosity (Gardner-Holdt) | Q–R |

EXAMPLE 11

Still another illustrative butylated methylolated acrylamide-containing interpolymer is produced using the process set forth in Example 1 from the following components:

*Charge Composition*

| | Grams |
|---|---|
| Acrylamide | 150 |
| Styrene | 450 |
| Ethyl acrylate | 400 |
| Xylol | 233 |
| n-Butanol | 433 |
| Butyl Cellosolve | 320 |
| 40% solution formaldehyde in butanol | 275 |
| di-Tert-butyl peroxide | 5 |
| Triethyl amine | 3.2 |
| Azobisbutyronitrile | 5 |
| Tert-dodecyl mercaptan | 16 |

The resin product has the following final characteristics:

| | |
|---|---|
| Solids (percent) | 49.5 |
| Viscosity (Gardner-Holdt) | V–W |

EXAMPLE 12

This example demonstrates the formation in situ of triethyl amine salt, which acts as a catalyst for the curing of the interpolyer on baking.

*Charge Composition*

COMPONENT A

| | Grams |
|---|---|
| Butanol | 450 |
| 40% solution of formaldehyde in butanol | 285 |

COMPONENT B

| | |
|---|---|
| Acrylamide | 150 |
| Butyl Cellosolve | 320 |
| Butanol | 200 |

COMPONENT C

| | |
|---|---|
| Styrene | 400 |
| Methyl acrylate | 100 |
| Ethyl acrylate | 350 |
| Triethyl amine | 6 |
| Azobisbutyronitrile | 10 |
| Benzoyl peroxide | 3 |
| Tert-dodecyl mercaptan | 17 |

Using the equipment specified in Example 1, Component A is charged to the reactor and heated to 230° F. Component B is then dissolved in the heated charge in the reactor. The materials listed in Component C are then premixed and added to the reactor slowly over a 2 hour period, the contents of the reactor being maintained at 240–250° F.

The reaction is continued until 27 grams of water are removed by distillation providing a solution containing 47% by weight of non-volatile resin solids and a viscosity on the Gardner-Holdt scale of Q–R, the viscosity being measured at 25° C. 10 grams of maleic anhydride are added to this solution and 400 ccs. of butanol are distilled away and replaced with xylol. The mixture is then refluxed to distill off 6 additional grams of water.

The product has the following final characteristics:

| | |
|---|---|
| Solids (percent) | 48.4 |
| Viscosity (Gardner-Holdt) | Q |

This product requires no additional acid catalyst. Films thereof baked for 20 minutes at 250° F. have excellent solvent resistance due to catalytic action of the salt of triethyl amine and maleic anhydride.

It will be understood that the invention is illustrated, but not limited by the specific examples which have been presented hereinbefore. It will also be evident that the products of the invention, while useful in diverse types of heat-hardening resinous compositions are primarily useful in the coating art in which event they are applied either alone or in combination with other resins, desirably from a compatible organic solvent solution. These coating solutions may be pigmented or contain dyes, flow control agents, waxes and various other components as will be evident to those skilled in the art.

The invention is defined in the claims which follow.

We claim:

1. A method of producing heat-hardenable resinous, alkylolated acrylamide-containing interpolymer comprising forming an organic solvent solution comprising a mixture of polymerizable monoethylenically unsaturated monomers including an acrylamide, a compound providing aliphatic aldehyde, a free-radical generating polymerization catalyst, and at least 0.1% by weight, based on the total weight of monomers being copolymerized, of an alkaline catalyst, and maintaining said solution at elevated temperature to cause polymerization and simultaneous reaction of amido hydrogen atoms with the aldehyde contained in said solution.

2. A method as recited in claim 1 in which said mixture of monoethylenically unsaturated monomers includes an acrylamide and at least one other polymerizable unsaturated monomer having a $CH_2=C<$ group.

3. A method as recited in claim 2 in which said mixture of monoethylenically unsaturated monomers includes an acrylamide and a proportion of monomer selected from the group consisting of styrene, $C_1$–$C_4$ alkyl- and halogen ring-substituted styrene and methyl methacrylate and a proportion of monoethylenically unsaturated carboxylic ester having a terminal aliphatic hydrocarbon chain of from 2–20 carbon atoms.

4. A method as recited in claim 1 in which said alkaline catalyst is a nitrogen base compound present in an amount of from 0.1%–1.0% by weight.

5. A method as recited in claim 4 in which said nitrogen base compound is an ammonium compound.

6. A method as recited in claim 4 in which said nitrogen base compound is an amine.

7. A method as recited in claim 6 in which said amine is a tertiary amine.

8. A method of producing heat-hardenable resinous, etherified alkylolated acrylamide-containing interpolymer comprising forming an organic solvent solution comprising a mixture of polymerizable monoethylenically unsaturated monomers including an acrylamide, compound providing aliphatic aldehyde, a free-radical generating polymerization catalyst, alcohol containing from 3–8 carbon atoms in the molecule and from 0.1%–1.0% by weight, based on the total weight of monomers being copolymerized of an alkaline catalyst, and maintaining said solution at elevated temperature to cause polymerization, simultaneous reaction of amido hydrogen atoms with the aldehyde contained in said solution and at least partial etherification of the alkylol groups produced by reaction with said aldehyde.

9. A method as recited in claim 8 in which said mixture of monoethylenically unsaturated monomers includes an acrylamide and at least one other polymerizable unsaturated monomer having a $CH_2=C<$ group.

10. A method as recited in claim 8 in which said alkaline catalyst is a nitrogen base compound.

11. A method as recited in claim 8 in which said monomers are supplied to said organic solvent slowly and at a uniform rate.

12. A method as recited in claim 8 in which said aldehyde is employed in an amount of from 0.2–5 equivalents of aldehyde for each amide group provided by said acrylamide.

13. A method as recited in claim 12 in which said aldehyde is formaldehyde.

14. A method as recited in claim 8 in which said alcohol is a butanol.

References Cited by the Examiner

UNITED STATES PATENTS

| | | | |
|---|---|---|---|
| 2,173,005 | 9/39 | Strain | 260—874 |
| 2,870,117 | 1/59 | Vogel et al. | 260—72 |
| 2,978,437 | 4/61 | Christenson et al. | 260—72 |
| 3,037,963 | 6/62 | Christenson | 260—72 |

LEON J. BERCOVITZ, *Primary Examiner.*

WILLIAM H. SHORT, DONALD E. CZAJA, *Examiners.*